(12) United States Patent
Jung et al.

(10) Patent No.: US 9,618,019 B2
(45) Date of Patent: Apr. 11, 2017

(54) HYDRAULIC PRESSURE CONTROL DEVICE FOR CONSTRUCTION MACHINERY

(71) Applicant: VOLVO CONSTRUCTION EQUIPMENT AB, Eskilstuna (SE)

(72) Inventors: Tae-Rang Jung, Busan (KR); Mi-OK Kim, Changwon-si (KR)

(73) Assignee: VOLVO CONSTRUCTION EQUIPMENT AB (SE)

( * ) Notice: Subject to any disclaimer, the term of this patent is extended or adjusted under 35 U.S.C. 154(b) by 0 days.

(21) Appl. No.: 14/900,531

(22) PCT Filed: Jun. 28, 2013

(86) PCT No.: PCT/KR2013/005743
§ 371 (c)(1),
(2) Date: Dec. 21, 2015

(87) PCT Pub. No.: WO2014/208796
PCT Pub. Date: Dec. 31, 2014

(65) Prior Publication Data
US 2016/0146230 A1 May 26, 2016

(51) Int. Cl.
*F15B 15/14* (2006.01)
*E02F 9/22* (2006.01)
(Continued)

(52) U.S. Cl.
CPC .......... *F15B 15/149* (2013.01); *B60T 13/686* (2013.01); *E02F 9/128* (2013.01);
(Continued)

(58) Field of Classification Search
CPC ........ B60T 13/686; E02F 9/125; E02F 9/128; E02F 9/2095; E02F 9/2217; E02F 9/2285;
(Continued)

(56) References Cited

U.S. PATENT DOCUMENTS

| 9,057,173 B2 * | 6/2015 | Hiroki .................. B60L 11/123 |
| 2013/0008155 A1 | 1/2013 | Kim |
| 2013/0239560 A1 | 9/2013 | Kim et al. |

FOREIGN PATENT DOCUMENTS

| CN | 1209851 A | 3/1999 |
| CN | 102359133 A | 2/2012 |

(Continued)

OTHER PUBLICATIONS

International Search Report (in English and Korean) and Written Opinion of the International Searching Authority (in Korean) for PCT/KR2013/005743, mailed Mar. 21, 2014; ISA/KR.

(Continued)

*Primary Examiner* — Logan Kraft
(74) *Attorney, Agent, or Firm* — Harness, Dickey & Pierce, P.L.C.

(57) ABSTRACT

The present invention relates to a hydraulic pressure control device for construction machinery, comprising: a pilot pump; a swing motor for rotary-actuating an upper turning body; a brake control valve for controlling the direction of a hydraulic pressure of the pilot pump to operate a brake; a controller for receiving a command signal for driving the swing motor and applying the command signal to the brake control valve; a relief valve interposed between the brake control valve and the pilot pump; and a drain control valve, disposed in parallel with the brake control valve, for performing opening and closing operations so that the hydraulic pressure of the pilot pump can selectively return to a hydraulic tank in accordance with the state of the brake control valve, the drain control valve being opened for the hydraulic pressure to be discharged to the hydraulic tank without passing through the relief valve if the brake control valve is switched to brake the swing motor.

8 Claims, 3 Drawing Sheets

(51) Int. Cl.
*E02F 9/12* (2006.01)
*E02F 9/20* (2006.01)
*B60T 13/68* (2006.01)
*F15B 13/02* (2006.01)
*F15B 1/02* (2006.01)

(52) U.S. Cl.
CPC .......... *E02F 9/2095* (2013.01); *E02F 9/2217* (2013.01); *E02F 9/2285* (2013.01); *F15B 13/024* (2013.01); *F15B 1/021* (2013.01); *F15B 2211/50545* (2013.01); *F15B 2211/635* (2013.01); *F15B 2211/6355* (2013.01); *F15B 2211/715* (2013.01)

(58) Field of Classification Search
CPC ...... F15B 1/021; F15B 13/024; F15B 13/043; F15B 13/0431; F15B 15/149; F15B 2211/355; F15B 2211/50545; F15B 2211/635; F15B 2211/6355; F15B 2211/715
See application file for complete search history.

(56) References Cited

FOREIGN PATENT DOCUMENTS

| | | | |
|---|---|---|---|
| CN | 102985704 A | 3/2013 | |
| JP | DE 3346973 A1 * | 7/1985 | ............. E02F 9/123 |
| JP | H09302729 A | 11/1997 | |
| JP | 2010156136 A | 7/2010 | |
| KR | 1020030051004 A | 6/2003 | |
| KR | 1020080050909 A | 6/2008 | |
| KR | 1020110074311 A | 6/2011 | |

OTHER PUBLICATIONS

First Office Action (in Chinese) issued by the State Intellectual Property Office (SIPO) on Nov. 1, 2016 for corresponding Chinese Patent Application No. 201380077878.9 (8 pages).

* cited by examiner

HYDRAULIC PRESSURE CONTROL DEVICE FOR CONSTRUCTION MACHINERY

CROSS-REFERENCE TO RELATED APPLICATION

This application is a 371 U.S. National Stage of International Application No. PCT/KR2013/005743, filed on Jun. 28, 2013. The entire disclosure of the above application is incorporated herein by reference.

TECHNICAL FIELD

The present invention relates to a hydraulic control apparatus for a construction machine. More particularly, the present invention relates to such a hydraulic control apparatus for a construction machine, in which hydraulic fluid discharged from a pilot pump is automatically drained to a hydraulic tank without passing through a relief valve in the braking state of a swing motor brake to prevent a load from continuously occurring at the relief valve.

BACKGROUND OF THE INVENTION

In general, a construction machine such as an excavator or a wheel loader includes a lower traveling structure and an upper swing structure swingably mounted on the lower traveling structure so that the construction machine can be useful for performing the construction work.

FIG. 1 is a diagrammatic view schematically showing an excavator which is a construction machine that can perform the construction work while an upper swing structure is swiveled with respect to a lower traveling structure.

In a conventional construction machine 1, work apparatuses (or attachments) 4 such as a boom, an arm, and a bucket are provided on an upper swing structure 2 so as to be positioned in proximity to an operator's cab. The work apparatuses 4 and the upper swing structure 2 are driven by hydraulic fluid discharged from a hydraulic pump. For example, the work apparatuses 4 are driven by each actuator including a hydraulic cylinder, and the upper swing structure 2 can be swingably rotated with respect to the lower traveling structure 3 by the rotation of a swing motor 10 during the traveling operation and the construction work.

The upper swing structure as described above can be stopped in rotation by a swing motor brake device. The swing motor brake device is maintained in a braking state at a normal condition, but when the hydraulic pressure from the pilot pump is supplied thereto, the braking state of the swing motor brake device is released.

However, the hydraulic fluid from the pilot pump is partially stored in an accumulator and the remaining hydraulic fluid is returned to a hydraulic tank via a relief valve in the braking state of the swing motor brake device or during the operation of the brake. This causes a problem in that a load continuously occurs at the relief valve, thus resulting in a decrease in the energy efficiency.

Even in the case where a hydraulic circuit is configured such that a hydraulic pressure is used at a traveling speed switching valve, for example, a first or second traveling speed switching valve or a traveling control valve to change the traveling speed in the braking state of the swing motor brake, the load continuously occurs at the relief valve and thus the energy efficiency decreases as described above.

SUMMARY OF THE INVENTION

Accordingly, the present invention has been made to solve the aforementioned problems occurring in the prior art, and it is an object of the present invention to provide a hydraulic control apparatus for a construction machine, in which, hydraulic fluid discharged from a pilot pump is automatically drained to a hydraulic tank without passing through a relief valve in the braking state of a swing motor brake to prevent a load from continuously occurring at the relief valve.

Another object of the present invention is to provide a hydraulic control apparatus for a construction machine, in which even in the case where there is no manipulation for changing the traveling speed in the braking state of the swing motor brake, hydraulic fluid discharged from a pilot pump is automatically drained to a hydraulic tank without passing through a relief valve to prevent a load from continuously occurring at the relief valve.

TECHNICAL SOLUTION

To achieve the above object, in accordance with an embodiment of the present invention, there is provided a hydraulic control device for a construction machine, including:

A hydraulic control apparatus for a construction machine comprising:

a pilot pump configured to provide a pilot hydraulic pressure;

a swing motor configured to swingably rotate an upper swing structure;

a swing motor brake coupled to the swing motor to brake the swing motor at a normal condition and configured to be released to rotate the swing motor when the pilot hydraulic pressure is supplied thereto;

a brake control valve installed between the pilot pump and the swing motor brake and configured to control a direction of the pilot hydraulic pressure to allow for the braking and release of the swing motor brake;

a controller configured to receive a command signal for driving the swing motor and apply the received command signal to the brake control valve;

a relief valve installed between the brake control valve and the pilot pump and, if a hydraulic pressure that exceeds a predetermined relief pressure is generated between the brake control valve and the pilot pump, configured to allow the hydraulic pressure to be returned to a hydraulic tank; and a drain control valve installed in parallel with the brake control valve and configured to be opened or closed so that the pilot hydraulic pressure is selectively returned to the hydraulic tank depending on a state of the brake control valve, wherein if the brake control valve is shifted to rotate the swing motor, the drain control valve is closed, while if the brake control valve is shifted to brake the swing motor 10, the drain control valve is opened so that the hydraulic pressure is drained to the hydraulic tank without passing through the relief valve.

The hydraulic control apparatus for a construction machine in accordance with the present invention may further include an accumulator installed in a flow path formed between the brake control valve and the pilot pump and configured to store the hydraulic fluid that is discharged from the pilot pump.

In addition, the hydraulic control apparatus for a construction machine in accordance with the present invention may further include: a switch installed to be electrically connected to the controller; and a signal pressure control valve installed on a downstream side of the drain control valve and configured to be opened or closed so as to control the pilot hydraulic pressure that passes through the drain control valve depending on a manipulation of the switch.

In accordance with a preferred embodiment of the present invention, the controller may control the brake control valve depending to be opened and closed on a manipulation signal that is applied thereto from a work apparatus manipulation lever.

Further, in accordance with a preferred embodiment of the present invention, a traveling control valve may be installed at a downstream side of the signal pressure control valve in such a manner as to be connected to the signal pressure control valve.

In accordance with a preferred embodiment of the present invention, the traveling control valve may be configured as a first or second traveling speed control valve.

ADVANTAGEOUS EFFECT

The hydraulic control apparatus for a construction machine in accordance with the present invention as constructed above has the following advantages.

The hydraulic fluid discharged from the pilot pump is automatically drained to the hydraulic tank by the drain control valve without passing through the relief valve in the braking state of the swing motor brake so that the reduction in a load of the relief valve and the improvement of the energy efficiency of the hydraulic system can be promoted.

In addition, the drain control valve is operated even in the case where there is no manipulation for changing the traveling speed in the braking state of the swing motor brake so that the load of the relief valve can be significantly reduced. Besides, in the case where there is a manipulation for changing the traveling speed under the circumstances, the hydraulic fluid discharged from the pilot pump is automatically used as a signal pressure for the control of the traveling control valve without passing through the relief valve so that the energy of a hydraulic system can be efficiently utilized.

BRIEF DESCRIPTION OF THE DRAWINGS

The above objects, other features and advantages of the present invention will become more apparent by describing the preferred embodiments thereof with reference to the accompanying drawings, in which.

DETAILED DESCRIPTION OF THE INVENTION

Figure 1:
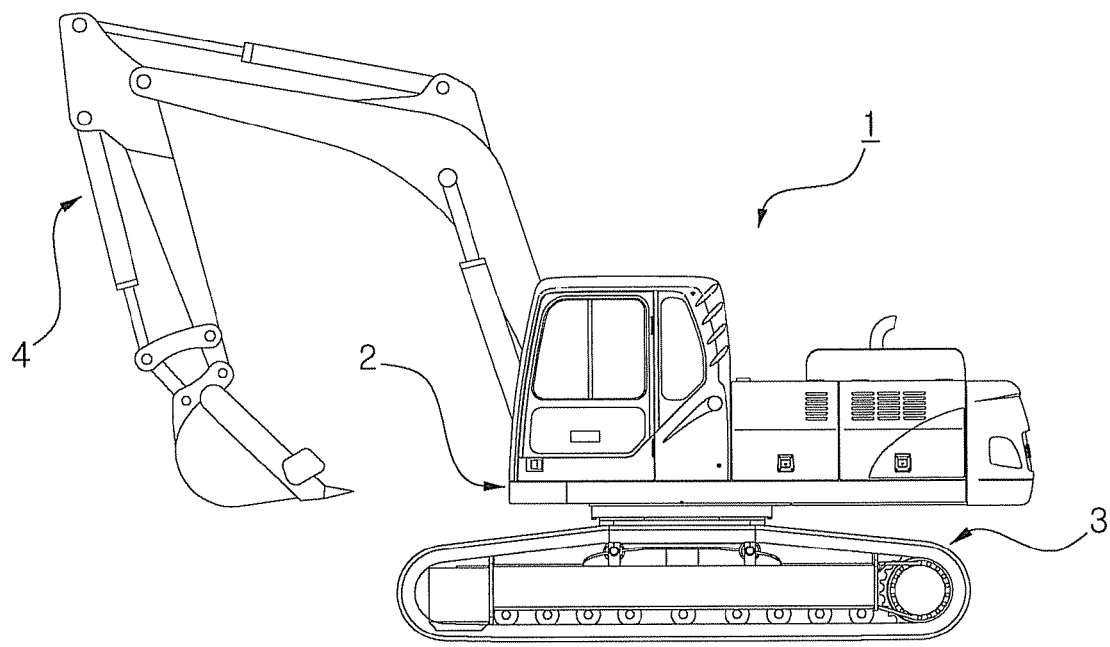
FIG. 1 is a diagrammatic view schematically showing an excavator which is a construction machine that can perform the construction work while an upper swing structure is swiveled with respect to a lower traveling structure.

Hereinafter, a hydraulic control apparatus for a construction machine in accordance with a preferred embodiment of the present invention will be described in detail with reference to the accompanying drawings. The matters defined in the description, such as the detailed construction and elements, are nothing but specific details provided to assist those of ordinary skill in the art in a comprehensive understanding of the invention, and the present invention is not limited to the embodiments disclosed hereinafter.

In order to definitely describe the present invention, a portion having no relevant to the description will be omitted, and through the specification, like elements are designated by like reference numerals.

In the specification and the claims, when a portion includes an element, it is meant to include other elements, but not exclude the other elements unless otherwise specifically stated herein.

Prior to the following detailed description, the terms or words used in the specification and the claims of the present invention should not be construed as being typical or dictionary meanings, but should be construed as meanings and concepts conforming to the technical spirit of the present invention on the basis of the principle that an inventor can properly define the concepts of the terms in order to describe his or her invention in the best way.

Figure 2:
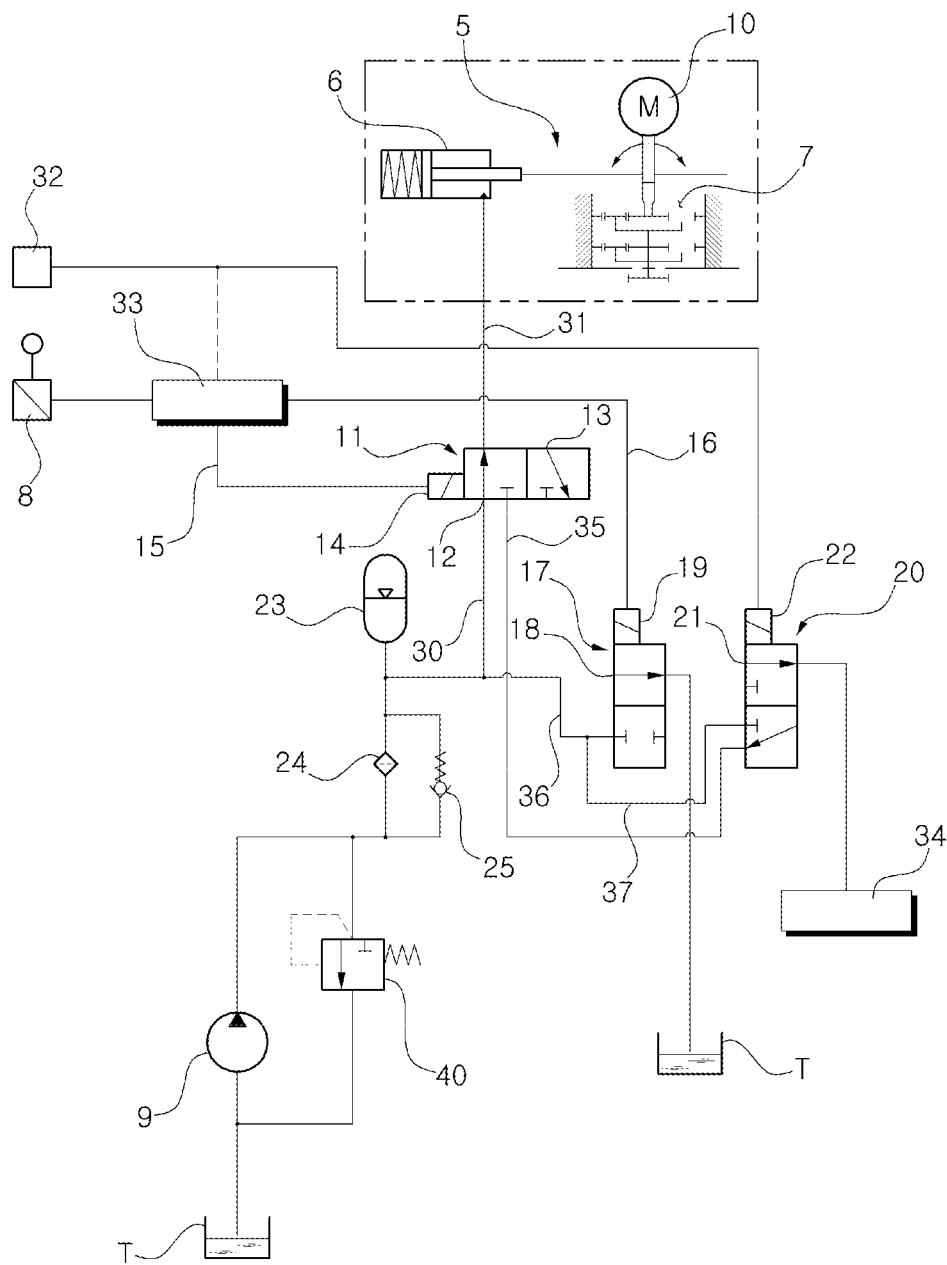
FIG. 2 is a hydraulic circuit diagram showing the brake release control operation of the brake control valve to rotate the swing motor in accordance with a preferred embodiment of the present invention.
Figure 3:
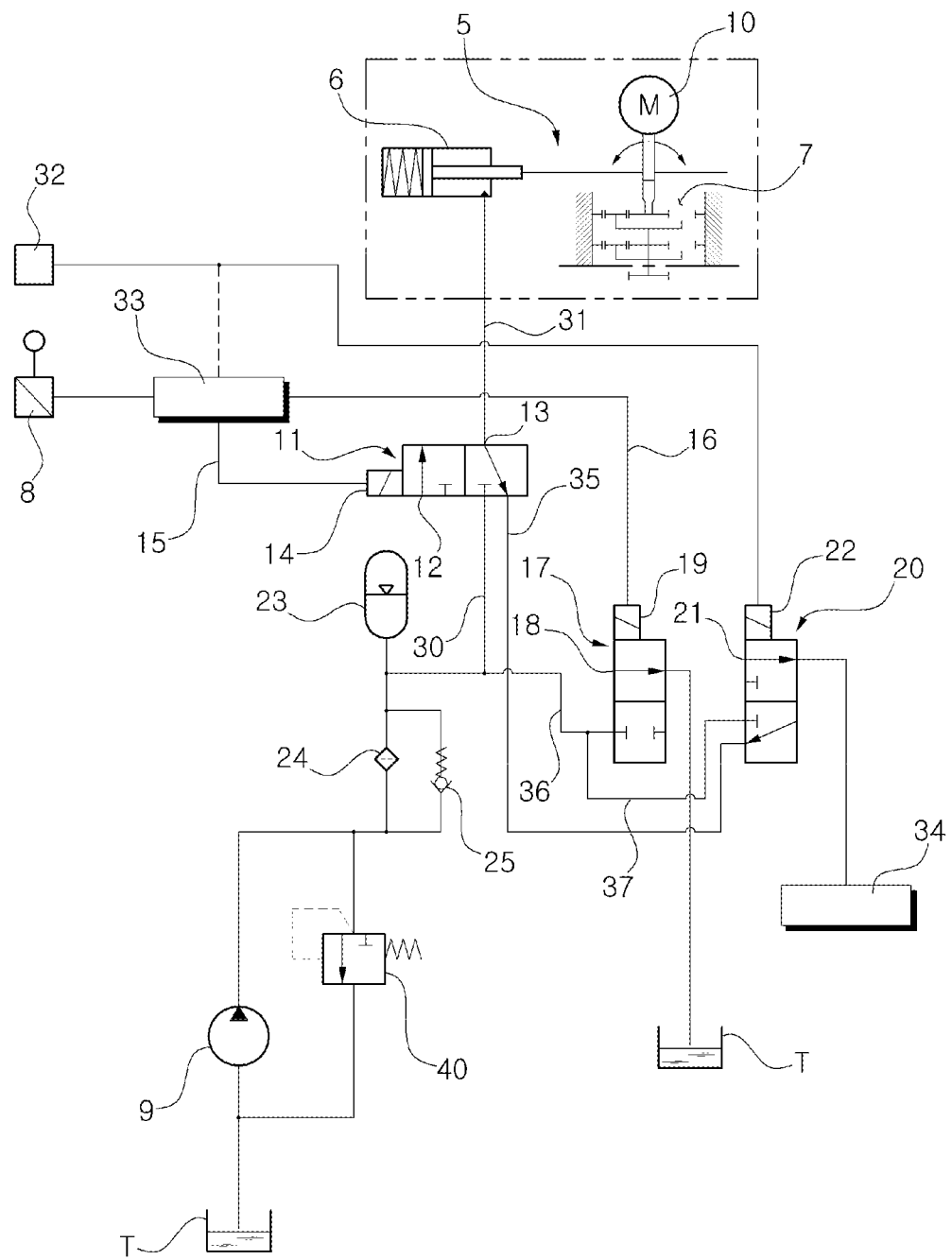
FIG. 3 is a hydraulic circuit diagram as shown in FIG. 2, showing the flow of a hydraulic pressure when a brake control valve is operated to be closed to brake the swing motor at a normal condition.

FIG. 2 is a hydraulic circuit diagram showing the brake release control operation of the brake control valve to rotate the swing motor in accordance with a preferred embodiment of the present invention, and FIG. 3 is a hydraulic circuit diagram as shown in FIG. 2, showing the flow of a hydraulic pressure when a brake control valve is operated to be closed to brake the swing motor at a normal condition.

FIG. 2 shows a hydraulic circuit diagram for describing the braking operation of the swing motor brake in accordance with a preferred embodiment of the present invention.

Prior to the following detailed description, a reference numeral denotes a swing motor brake, a reference numeral 9 denotes a pilot pump, a reference numeral 10 denotes a swing motor, a reference numeral denotes a brake control valve, a reference numeral 17 denotes a drain control valve, a reference numeral 20 denotes a signal pressure control valve, a reference numeral 33 denotes a controller, a reference numeral 32 denotes a switch, a reference numeral 40 denotes a relief valve.

As shown in FIGS. 2 and 3, the hydraulic control apparatus for a construction machine 1 in accordance with the present invention is configured such that the release operation of the swing motor brake 5 is performed by a hydraulic pressure discharged from the pilot pump 9 in the construction machine 1 including an excavator, and the hydraulic pressure is drained to a hydraulic tank T by the drain control valve 17 without passing through the relief valve 40 when the brake control valve 11 is shifted to allow the swing motor brake 5 to be released.

More specifically, referring to the drawings, a hydraulic control apparatus for a construction machine in accordance with the present invention includes a pilot pump 9 that is configured to provide a pilot hydraulic pressure, and a swing motor 10 that is configured to swingably rotate an upper swing structure.

The swing motor 10 is driven by a hydraulic pressure, and can be supplied with the hydraulic pressure from a swing pump (not shown) installed at a known excavator. In addition, a swing control valve (not shown) that changes a direction of the hydraulic pressure discharged from the swing pump can convert the rotation direction of the swing motor 10. Thus, the rotation or swing of the upper swing structure 2 is performed in the traveling or construction work.

The hydraulic control apparatus for a construction machine in accordance with the present invention includes a swing motor brake 5 that is coupled to the swing motor 10 to brake the swing motor 10 at a normal condition and is released to rotate the swing motor 10 when the pilot hydraulic pressure is supplied thereto, and a brake control valve 11 that is installed between the pilot pump 9 and the swing motor brake 5 and is configured to control a direction of the pilot hydraulic pressure or hydraulic fluid discharged from the pilot pump 9 to allow for the braking and release of the swing motor brake 5.

The brake control valve 11 may include a supply port 12, a return port 13, and a solenoid 14 that is driven in response to an electrical control signal or a command signal.

In addition, the swing motor brake 5 includes a brake cylinder 6 and a multi-disk brake 7. A piston of the brake cylinder 6 is elastically supported so that the multi-disk brake 7 is coupled to the swing motor 10 by a frictional force to restrict the rotation of the swing motor 10 in the normal state.

In the description of the present invention, the phrase "normal condition" is intended to understand a work condition of the construction machine in which the upper swing structure 2 are not required to be rotated. The term "normal state" should be construed as including a state in which a swing pump or a swash plate control device for the swing pump is controlled to a neutral position and a state in which there are no a pilot signal pressure or an electrical control signal according to the manipulation of a manipulation lever or a joystick, and a command signal corresponding to the manipulation.

In the meantime, the hydraulic control apparatus for a construction machine in accordance with the present invention includes: a controller 33 that is configured to receive a command signal for driving the swing motor 10 and apply the received command signal to the brake control valve 11; a relief valve 40 that is installed between the brake control valve 11 and the pilot pump 9 and, if a hydraulic pressure that exceeds a predetermined relief pressure is generated between the brake control valve 11 and the pilot pump 9, is configured to allow the hydraulic pressure to be returned to a hydraulic tank T; and a drain control valve 17 that is installed in parallel with the brake control valve 11 and configured to be opened or closed so that the pilot hydraulic pressure is selectively returned to the hydraulic tank T depending on a state of the brake control valve 11.

Preferably, the drain control valve 17 may include an inlet port 18 to which the hydraulic fluid from the pilot pump 9 is introduced, and a solenoid 19 that is driven in response to an electrical control signal or a command signal. When the brake control valve 11 is shifted to rotate the swing motor 10 or allow for the release of the swing motor brake 5, the drain control valve 17 is closed. On the other hand, when the brake control valve 11 is shifted to restrict the rotation of the swing motor 10 or allow for the braking of the swing motor brake 5, the drain control valve 17 is opened so that the hydraulic pressure is drained to the hydraulic tank T without passing through the relief valve 40.

Meanwhile, the hydraulic control apparatus for a construction machine in accordance with the present invention further includes an accumulator 23 that is installed in a supply line 30 formed between the brake control valve 11 and the pilot pump 9 and is configured to store the hydraulic fluid that is discharged from the pilot pump 9.

A filter 24 may be provided between the pilot pump 9 and the accumulator 23 in consideration of viscosity and performance of the hydraulic fluid on the supply line 20. In addition, a check valve 25 may be further provided between the pilot pump 9 and the accumulator 23 to prevent the backflow of the hydraulic fluid from the accumulator 23.

The hydraulic control apparatus for a construction machine in accordance with the present invention further includes a switch 32 that is installed to be electrically connected to the controller 33, and a signal pressure control valve 20 that is installed on a downstream side of the drain control valve 17 and is opened or closed so as to control the pilot hydraulic pressure that passes through the drain control valve 17 depending on a manipulation of the switch 32.

The signal pressure control valve 20 may include an inlet port 21 for a pilot signal pressure, and a solenoid 22 for a control signal that depends on the manipulation of the switch 32.

The controller 33 may be configured as an electronic control unit (ECU) or a vehicle electronic control unit (VECU) for the construction machine. The controller 33 controls the brake control valve 11 to be opened or closed depending on a manipulation signal that is applied thereto from a swing joystick or a work apparatus manipulation lever 8.

Preferably, as described above, the controller 33 that processes a predetermined command signal can receive an electrical signal as a manipulation signal from the joystick 8 to swing or rotate the upper swing structure 2, and output a control signal for application to the brake control valve 11 or the drain control valve 17 to open and close the brake control valve 11 or the drain control valve 17 in response to the manipulation signal from the joystick 8.

The control signal includes an electric solenoid control signal, and can be separately or simultaneously applied to the brake control valve 11 and the drain control valve 17.

In accordance with the present invention, a traveling control valve 34 is installed at a downstream side of the signal pressure control valve 20 in such a manner as to be connected to the signal pressure control valve 20. Preferably, the traveling control valve 34 is configured as a first or second traveling speed control valve.

Best Mode for Carrying Out the Invention

Hereinafter, the construction and operating principle of the hydraulic control apparatus for a construction machine in accordance with an embodiment of the present invention will be described with reference to the accompanying drawings.

Referring to FIG. 2, when the swing motor brake 5 is operated to release the braking of the swing motor 10 to cause the upper swing structure 2 to be swiveled, the hydraulic fluid discharged from the pilot pump 9 is supplied to the brake cylinder 6 of the swing motor brake 5 in response to the opening of the brake control valve 11.

On the other hand, referring to FIG. 3, the brake control valve 11 is maintained in a closed state so that the swing motor brake 5 brakes the swing motor 10 to restrict the rotation of the swing motor 10 at a normal condition. In this case, the hydraulic fluid or the pilot hydraulic pressure discharged from the pilot pump 9 can be drained to the hydraulic tank T through the drain control valve 17 without passing through the relief valve 40.

More preferably, in the case where there is no manipulations or signal for allowing for the release of the swing motor brake 5 or changing the traveling speed, the hydraulic fluid or the pilot hydraulic pressure discharged from the pilot pump 9 can be drained to the hydraulic tank T through the drain control valve 17 without passing through the relief valve 40.

Specifically, the operating principle of the hydraulic control apparatus during the release of the swing motor brake 5 will be described When an operator performs the operation of the work apparatus 4 or the upper swing structure 2, the swing motor brake 5 is released. For example, when the operator manipulates the manipulation lever or the joystick 8, the controller 33 receives an electrical signal according to the manipulation of the joystick as a command signal corresponding to the release of the brake and applies a valve control command signal for the release of the swing motor brake 5 to the brake control valve 11.

Specifically, as shown in FIG. 2, when the joystick 8 is manipulated by the operator and thus the command signal according to the manipulation of the joystick 8 is applied to the controller 33, the controller 33 applies a command signal to the brake control valve 11 to cause the brake control valve 11 to be opened.

When the command signal which is an electrical control signal is applied to the solenoid 14 of the brake control valve 11, the brake control valve 11 is opened by the movement or stroke of the solenoid 14. In this case, the hydraulic fluid or pilot hydraulic pressure discharged from the pilot pump 9 is supplied to the brake cylinder 6 via the supply line 30, the supply port 20, and a brake hydraulic line 31.

At this time, the drain control valve 17 is maintained in a closed state, and the hydraulic fluid or pilot hydraulic pressure discharged from the pilot pump 9 can be supplied to the brake cylinder 6 without being drained via a drain line 36.

The rotation direction of the swing motor 10 depends on the control of the direction of the pilot hydraulic pressure by the swing control valve, and thus the swingable rotation of the upper swing structure 2 is performed.

In the meantime, a case where the swing motor brake 5 brakes the swing motor 10 at a normal condition will be described hereinafter.

For example, when an operator does not perform the operation of the work apparatus 4 or the upper swing structure 2 at the normal condition, the swing motor brake 5 is maintained in the braking state to brake the swing motor 10 by the engagement between the swing motor 10 and the brake disk 7.

In this case, the brake control valve 11 is maintained in a closed state in response to the command signal of the controller 33.

Referring to FIG. 3, the brake control valve 11 is closed in response to the command signal applied thereto from the controller 33, and the hydraulic fluid or pilot hydraulic pressure discharged from the pilot pump 9 can be filled in the accumulator 24 via the filter 24.

In addition, a hydraulic pressure applied to the supply line 30 between the pilot pump 9 and the brake control valve 11 is introduced into the inlet port 18 of the drain control valve 17 via a parallel flow path 36 connected to the supply line 30.

In this case, a predetermined command signal or control signal from the controller 33 is applied to the solenoid 19 of the drain control valve 17 to drain the hydraulic pressure introduced into the inlet port 18, and thus the drain control valve 17 is opened so that the hydraulic pressure applied from the pilot pump 9 to the supply line 30, is drained to the hydraulic tank T via the drain control valve 17 through the parallel flow path 36 and the inlet port 18 without passing through the relief valve 40.

In this process, a load applied to the relief valve 40 is significantly reduced by a function of controlling the drain flow rate of the drain control valve 17, and the energy efficiency of the hydraulic system is improved.

In the meantime, in the case where there is no manipulation of the switch 32 for changing the traveling speed along with the braked state of the swing motor 10, for example, in the case where there is no manipulations or signal for allowing for the release of the swing motor brake 5 or changing the traveling speed, the signal pressure control valve 20 is maintained in a closed state.

Even in this case, similarly to the case as described above, when the predetermined command signal or control signal from the controller 33 is applied to the solenoid 19 of the drain control valve 17, the drain control valve 17 is opened in response to the predetermined command signal or control signal so that the hydraulic pressure applied from the pilot pump 9 to the supply line 30 is drained to the hydraulic tank T through the drain control valve 17 via the inlet port 18.

In accordance with the present invention, in the case where there is a manipulation of the switch 32 for changing the traveling speed along with the braked state of the swing motor 10, for example, in the case where there is a manipulation or signal for changing the traveling speed in the braking state of the swing motor brake 5, the hydraulic fluid or pilot hydraulic pressure discharged from the pilot pump 9 can be supplied as a predetermined pilot signal pressure.

For example, when the switch 32 is manipulated, the drain control valve 17 is closed in response to the predetermined command signal from the controller 33, and thus the hydraulic pressure applied from the pilot pump 9 to the supply line 30 is introduced into the inlet port 21 of the signal pressure control valve 20 through the parallel flow path 36 and a signal pressure line 37.

In this case, the signal pressure control valve 20 is switched to an opened state in response to a manipulation signal from the switch 32.

Thus, the hydraulic pressure from the pilot pump 9, which is introduced into the inlet port 21 through signal pressure line 37, is supplied, as a pilot signal pressure, to the traveling control valve 34.

Preferably, in accordance with an embodiment of the present invention, if the traveling control valve 34 is configured as a first or second traveling speed control valve, the pilot signal pressure can be supplied as a signal pressure for the shift of a valve spool for changing the traveling speed of the lower traveling structure 3.

If there is no manipulation of the switch 32 for changing the traveling speed along with the braked state of the swing motor 10, the drain control valve 17 is opened in response to the command signal from the controller 33, and the hydraulic pressure applied from the pilot pump 9 to the supply line 30 is drained to the hydraulic tank T through the drain control valve 17 via the inlet port 18.

Thus, a load applied to the relief valve 40 is reduced so that the energy efficiency of the hydraulic system is improved similarly to the case as described above.

INDUSTRIAL APPLICABILITY

In accordance with the hydraulic control apparatus for a construction machine of the present invention as constructed above, the hydraulic fluid discharged from the pilot pump is automatically drained to the hydraulic tank by the drain control valve without passing through the relief valve in the braking state of the swing motor brake so that the hydraulic control apparatus can be useful for promotion of the reduction in a load of the relief valve and the improvement of the energy efficiency of the hydraulic system.

While the present invention has been described in connection with the specific embodiments illustrated in the drawings, they are merely illustrative, and the invention is not limited to these embodiments. It is to be understood that various equivalent modifications and variations of the embodiments can be made by a person having an ordinary skill in the art without departing from the spirit and scope of the present invention. Therefore, the true technical scope of the present invention should not be defined by the above-mentioned embodiments but should be defined by the appended claims and equivalents thereof.

The invention claimed is:

1. A hydraulic control apparatus for a construction machine, comprising:
   a pilot pump configured to provide a pilot hydraulic pressure;
   a swing motor configured to swingably rotate an upper swing structure;
   a swing motor brake coupled to the swing motor to brake the swing motor at a normal condition and configured to be released to rotate the swing motor when the pilot hydraulic pressure is supplied thereto;
   a brake control valve installed between the pilot pump and the swing motor brake and configured to control a direction of the pilot hydraulic pressure to allow for the braking and release of the swing motor brake;
   a controller configured to receive a command signal for driving the swing motor and apply the received command signal to the brake control valve;
   a relief valve installed between the brake control valve and the pilot pump and, if a hydraulic pressure that exceeds a predetermined relief pressure is generated between the brake control valve and the pilot pump, configured to allow the hydraulic pressure to be returned to a hydraulic tank; and
   a drain control valve installed in parallel with the brake control valve and configured to be opened or closed so that the pilot hydraulic pressure is selectively returned to the hydraulic tank depending on a state of the brake control valve,
   wherein if the brake control valve is shifted to rotate the swing motor, the drain control valve is closed, while if the brake control valve is shifted to brake the swing motor, the drain control valve is opened so that the hydraulic pressure is drained to the hydraulic tank without passing through the relief valve.

2. The hydraulic control apparatus according to claim 1, further comprising an accumulator installed in a flow path formed between the brake control valve and the pilot pump and configured to store the hydraulic fluid that is discharged from the pilot pump.

3. The hydraulic control apparatus according to claim 2, further comprising a filter provided between the pilot pump and the accumulator.

4. The hydraulic control apparatus according to claim 3, further comprising a check valve provided between the pilot pump and the accumulator to prevent the backflow of the hydraulic fluid from the accumulator.

5. The hydraulic control apparatus according to claim 4, further comprising:
   a switch installed to be electrically connected to the controller; and
   a signal pressure control valve installed on a downstream side of the drain control valve and configured to be opened or closed so as to control the pilot hydraulic pressure that passes through the drain control valve depending on a manipulation of the switch.

6. The hydraulic control apparatus according to claim 5, wherein the controller controls the brake control valve to be opened or closed depending on a manipulation signal that is applied thereto from a work apparatus manipulation lever.

7. The hydraulic control apparatus according to claim 5, further comprising a traveling control valve installed at a downstream side of the signal pressure control valve in such a manner as to be connected to the signal pressure control valve.

8. The hydraulic control apparatus according to claim 6, wherein the traveling control valve comprises a first or second traveling speed control valve.

* * * * *